United States Patent
DeJaco et al.

(10) Patent No.: US 7,289,461 B2
(45) Date of Patent: Oct. 30, 2007

(54) COMMUNICATIONS USING WIDEBAND TERMINALS

(75) Inventors: Andrew P. DeJaco, San Diego, CA (US); Khaled El-Maleh, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 666 days.

(21) Appl. No.: 09/811,056

(22) Filed: Mar. 15, 2001

(65) Prior Publication Data

US 2002/0131377 A1   Sep. 19, 2002

(51) Int. Cl.
*H04Q 7/00* (2006.01)
*H04L 12/66* (2006.01)
*G10L 19/00* (2006.01)

(52) U.S. Cl. ............ 370/328; 370/352; 370/466; 704/212

(58) Field of Classification Search ........ 370/328–329, 370/464–469, 352–354; 704/200, 212, 270.1
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,414,796 A | 5/1995 | Jacobs et al. | |
| 5,581,652 A * | 12/1996 | Abe et al. | 704/222 |
| 5,668,837 A * | 9/1997 | Dent | 375/316 |
| 5,768,308 A | 6/1998 | Pon et al. | 375/219 |
| 5,956,673 A * | 9/1999 | Weaver et al. | 704/211 |
| 5,983,172 A * | 11/1999 | Takashima et al. | 704/203 |
| 6,125,120 A * | 9/2000 | Lehtimaki | 370/435 |
| 6,172,974 B1 * | 1/2001 | Tseng et al. | 370/357 |
| 6,353,666 B1 * | 3/2002 | Henderson et al. | 379/229 |
| 6,556,844 B1 * | 4/2003 | Mayer | 455/560 |
| 6,681,202 B1 * | 1/2004 | Miet et al. | 704/214 |
| 6,792,267 B1 * | 9/2004 | Backstrom et al. | 455/422.1 |
| 6,826,404 B2 * | 11/2004 | Delfs et al. | 455/445 |

FOREIGN PATENT DOCUMENTS

| | | |
|---|---|---|
| DE | 19544367 | 11/1995 |
| EP | WO01/13658 A1 * | 2/2001 |
| EP | WO01/91489 A1 * | 11/2001 |
| GB | 2357682 A * | 6/2001 |
| WO | WO9963775 A1 * | 12/1999 |
| WO | WO 03/003770 A1 * | 1/2003 |

OTHER PUBLICATIONS

Zhou et al., Bypassing Vocoders in CDMA Mobile-to-Mobile Calls, Apr. 1998, IEEE, 0-7803-4320-4, pp. 2527-2531.*

(Continued)

*Primary Examiner*—Chi Pham
*Assistant Examiner*—Tri H. Phan
(74) *Attorney, Agent, or Firm*—Todd E. Marlette; Timothy F. Loomis; Thomas R. Rouse

(57) ABSTRACT

A call setup procedure is presented to permit vocoder bypass, which will allow the transmission of wideband speech packets between wideband terminals over narrowband transmission constraints. In addition, methods and apparatus are presented that allow the conversion between a wideband tandem-free operation, a narrowband tandem-free operation, and a standard tandem operation.

35 Claims, 5 Drawing Sheets

OTHER PUBLICATIONS

Greer et al., Standardization of the Selectable Mode Vocoder, Apr. 2001, IEEE, 0-7803-7041-4, pp. 953-956.*

3rd Generation Partnership Project: Technical Specification Group Services & System Aspects; 3GTS 28.062 V1.0.0 (Dec. 2000); pp. 1-23.*

U.S. Appl. No. 09/771,508 entitled "Enhanced Conversion of Wideband Signals to Narrowband Signals," filed Jan. 24, 2001. Andrew P. DeJaco, et al, QUALCOMM Incorporated, San Diego, California (USA).

ITU-T G.722 Standard: 7kHz Audio-Coding within 64 kBit/s—General Aspects of Digital Transmission Systems; Terminal Equipments Study Group XV and XVIII, Melbourne 1988. ITU Telecommunication Standardization Sector Information Handling Services, 2000. (pp. 269-341).

3rd Generation Partnership Project 2, "Tandem Free Operation," Dec. 1999.

3rd Generation Partnership Project: Technical Specification Group Services & System Aspects; 3G TS 28.062 (Jul. 2000).

3rd Generation Partnership Project: TSG-SA Codec Working Group; 3G TR 26.901 (Feb. 2000).

Universal Mobile Telecommunications Systems (UMTS); Out of Band Transcoder Control; ETSI TS 123 153 (Mar. 2001).

* cited by examiner (Not to scale)

(Not to scale)

(Not to scale)

COMMUNICATIONS USING WIDEBAND TERMINALS

BACKGROUND

I. Field of the Invention

The present invention relates to communication systems, and more particularly, to the transmission of wideband signals in communication systems.

II. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. (As used herein, the term "cellular" systems encompasses both cellular and personal communications services (PCS) frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95(IS-95). In particular, IS-95 and its derivatives, IS-95 A, IS-95 B, ANSI J-STD-008(often referred to collectively herein as IS-95), and proposed high-data-rate systems for data, etc. are promulgated by the Telecommunication Industry Association (TIA), the International Telecommunications Union (ITU), and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and fully incorporated herein by reference. An exemplary described system utilizing CDMA techniques is the cdma2000 ITU-R Radio Transmission Technology (RTT) Candidate Submission (referred to herein as cdma2000), issued by the TIA. The standard for cdma2000 is given in draft versions of IS-2000 and has been approved by the TIA. The cdma2000 proposal is compatible with IS-95 systems in many ways. Another CDMA standard is the W-CDMA standard, as embodied in $3^{rd}$ Generation Partnership Project "3 GPP", Document Nos. 3G TS 25.211, 3G TS 25.212, 3G TS 25.213, and 3G TS 25.214.

In a traditional landline telephone system, the transmission medium and terminals are bandlimited to 4000 Hz. Speech is typically transmitted in a narrow range of 300 Hz to 3400 Hz, with control and signaling overhead carried outside this range. In view of the physical constraints of landline telephone systems, signal propagation within cellular telephone systems is implemented with these same narrow frequency constraints so that calls originating from a cellular subscriber unit can be transmitted to a landline unit. However, cellular telephone systems are capable of transmitting signals with wider frequency ranges, since the physical limitations requiring a narrow frequency range are not present within the cellular system. An exemplary standard for generating signals with a wider frequency range is promulgated in document G.722 ITU-T, entitled "7 kHz Audio-Coding within 64 kBits/s," published in 1989.

In the transmission of speech signals, the perceptual quality of the acoustic waveform is of primary importance to users and service providers. If a wireless communication system transmits signals with a wideband frequency range of 50 Hz to 7000 Hz, a transportation problem arises when the wideband signal is carried through a narrowband environment that can attenuate the high frequency components of the wideband signal. Furthermore, a call setup problem occurs if an originating terminal is capable of generating a wideband signal, but lacks information as to the bandwidth capability of the target terminal.

Hence, there is a present need in the art to enable a communication system with the ability to allow a wideband wireless terminal to communicate with another wideband terminal over a narrowband transmission medium.

SUMMARY

Novel methods and apparatus for conveying wideband signals through a wireless communication system are presented. In one aspect, a method for determining whether a target terminal is capable of generating and receiving wideband signals is presented. In another aspect, a method for transmitting wideband speech signals over a narrowband communication system is presented, the method comprising: generating a narrowband digital signal at a base station from a plurality of data packets received from a remote station, wherein the plurality of data packets carry a wideband speech signal; puncturing the narrowband digital signal with the plurality of data packets; transmitting the punctured narrowband digital signal over the narrowband communication system to a second base station; separating the narrowband digital signal from the plurality of data packets at the second base station; and forwarding only the plurality of data packets to a second remote station.

In another aspect, a method for enhancing speech quality in a wireless environment is presented, the method comprising: transmitting a packetized wideband speech signal from a first remote station to a first base station; converting the packetized wideband speech signal into a narrowband pulse code modulation (PCM) signal at the first base station; negotiating between the first base station and a second base station for a tandem-free vocoder operation (TFO); puncturing the narrowband PCM signal with the packetized wideband speech signal; transmitting the punctured narrowband PCM signal to the second base station; negotiating for wideband capability between the second base station and a second remote station; receiving the punctured narrowband PCM signal at the second base station; and discarding the narrowband PCM signal at the second base station and disabling a local vocoder at the second base station, whereupon the packetized wideband speech signal is forwarded to the second remote station.

In another aspect, a method for transparently switching between a wideband communication session and a narrowband communication session is presented; the method comprising: generating a narrowband signal at a first base station from a packetized wideband signal received from an originating terminal; puncturing the narrowband signal with the wideband signal; transmitting the punctured narrowband signal from a first base station to a second base station; establishing the wideband communication session between the second base station and a target terminal by extracting the wideband signal from the punctured narrowband signal; and if the wideband communication session is interrupted, then establishing the narrowband communication session between the second base station and the target terminal by extracting the narrowband signal from the punctured narrowband signal.

DETAILED DESCRIPTION OF THE DRAWINGS

DETAILED DESCRIPTION OF THE EMBODIMENTS

Figure 1:
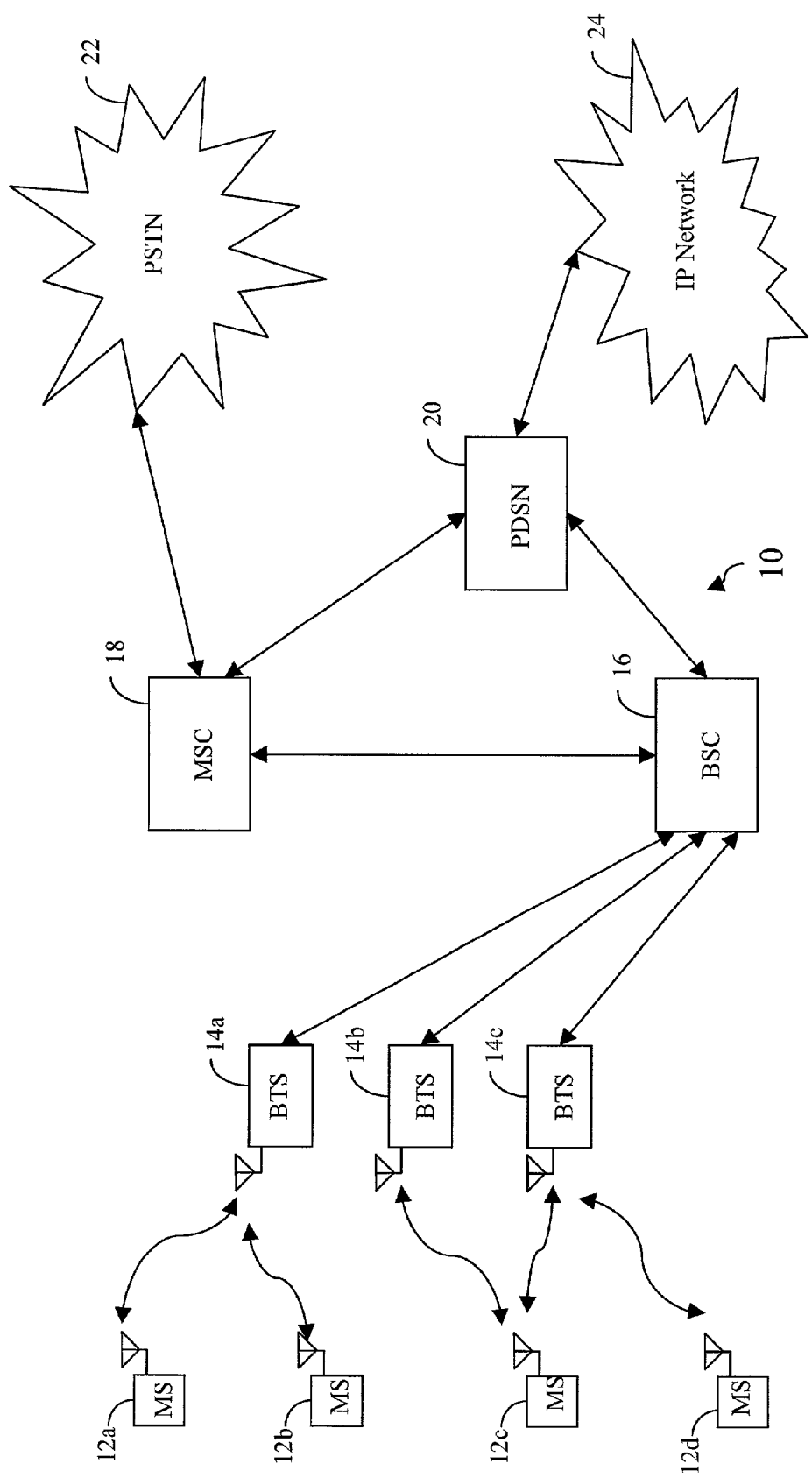
FIG. 1 is a diagram of an exemplary communication system.

As illustrated in FIG. 1, a wireless communication network 10 generally includes a plurality of remote stations (also called mobile stations or subscriber units or user equipment) 12a-12d, a plurality of base stations (also called base station transceivers (BTSs) or Node B) 14a-14c, a base station controller (BSC) (also called radio network controller or packet control function 16), a mobile switching center (MSC) or switch 24, a packet data serving node (PDSN) or internetworking function (IWF) 20, a public switched telephone network (PSTN) 22 (typically a telephone company), and an Internet Protocol (IP) network 18 (typically the Internet). For purposes of simplicity, four remote stations 12a-12d, three base stations 14a-14c, one BSC 16, one MSC 18, and one PDSN 20 are shown. It would be understood by those skilled in the art that there could be any number of remote stations 12, base stations 14, BSCs 16, MSCs 18, and PDSNs 20.

In one embodiment the wireless communication network 10 is a packet data services network. The remote stations 12a-12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, remote stations may be any type of communication unit.

The remote stations 12a-12d may be configured to perform one or more wireless packet data protocols such as described in, for example, the EIA/TIA/IS-707 standard. In a particular embodiment, the remote stations 12a-12d generate IP packets destined for the IP network 24 and encapsulate the IP packets into frames using a point-to-point protocol (PPP).

In one embodiment, the IP network 24 is coupled to the PDSN 20, the PDSN 20 is coupled to the MSC 18, the MSC 18 is coupled to the BSC 16 and the PSTN 22, and the BSC 16 is coupled to the base stations 14a-14c via wirelines configured for transmission of voice and/or data packets in accordance with any of several known protocols including, e.g., E1, T1, Asynchronous Transfer Mode (ATM), IP, Frame Relay, HDSL, ADSL, or xDSL. In an alternate embodiment, the BSC 16 is coupled directly to the PDSN 20, and the MSC 18 is not coupled to the PDSN 20. In another embodiment, the remote stations 12a-12d communicate with the base stations 14a-14c over an RF interface defined in the $3^{rd}$ Generation Partnership Project 2 "3 GPP2", "Physical Layer Standard for cdma2000 Spread Spectrum Systems," 3 GPP2 Document No. C.P0002-A, TIA PN-4694, to be published as TIA/EIA/IS-2000-2-A, (Draft, edit version 30) (Nov. 19, 1999), which is fully incorporated herein by reference.

During typical operation of the wireless communication network 10, the base stations 14a-14c receive and demodulate sets of reverse-link signals from various remote stations 12a-12d engaged in telephone calls, Web browsing, or other data communications. Each reverse-link signal received by a given base station 14a-14c is processed within that base station 14a-14c. Each base station 14a-14c may communicate with a plurality of remote stations 12a-12d by modulating and transmitting sets of forward-link signals to the remote stations 12a-12d. For example, as shown in FIG. 1, the base station 14a communicates with first and second remote stations 12a, 12b simultaneously, and the base station 14c communicates with third and fourth remote stations 12c, 12d simultaneously. The resulting packets are forwarded to the BSC 16, which provides call resource allocation and mobility management functionality including the orchestration of soft handoffs of a call for a particular remote station 12a-12d from one base station 14a-14c to another base station 14a-14c. For example, a remote station 12c is communicating with two base stations 14b, 14c simultaneously. Eventually, when the remote station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission, such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

Typically, conversion of an analog voice signal to a digital signal is performed by an encoder and conversion of the digital signal back to a voice signal is performed by a decoder. In an exemplary CDMA system, a vocoder comprising both an encoding portion and a decoding portion is collated within remote stations and base stations. An exemplary vocoder is described in U.S. Pat. No. 5,414,796, entitled "Variable Rate Vocoder," assigned to the assignee of the present invention and incorporated by reference herein. In a vocoder, an encoding portion extracts parameters that relate to a model of human speech generation. A decoding portion re-synthesizes the speech using the parameters received over a transmission channel. The model is constantly changing to accurately model the time varying speech signal. Thus, the speech is divided into blocks of time, or analysis frames, during which the parameters are calculated. The parameters are then updated for each new frame. As used herein, the word "decoder" refers to any device or any portion of a device that can be used to convert digital signals that have been received over a transmission medium. The word "encoder" refers to any device or any portion of a device that can be used to convert acoustic signals into digital signals. Hence, the embodiments described herein can be implemented with vocoders of CDMA systems, or alternatively, encoders and decoders of non-CDMA systems.

Figure 4:
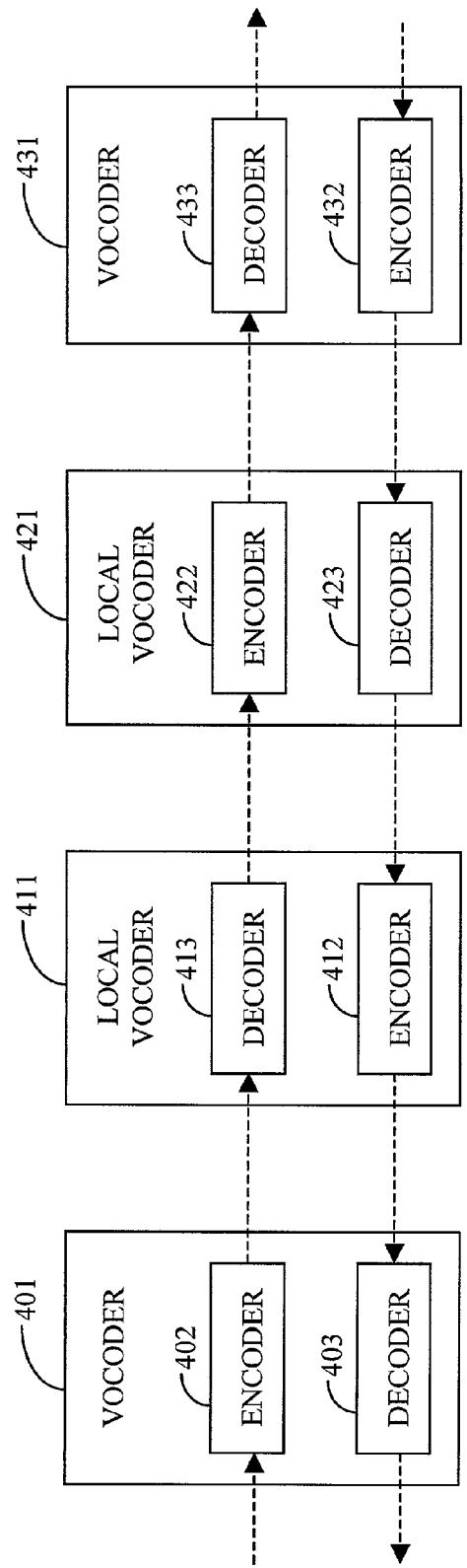
FIG. 4 is a block diagram of encoder and decoder use in a wireless communication system.

FIG. 4 is a block diagram of the encoding and decoding functions performed by various vocoders located within the communications equipment of the wireless communication system of FIG. 1. Remote station or terminal 12a is a communication device comprising a vocoder 401 with encoding portion 402 and decoding portion 403. Analog voice is received by the remote terminal 12a and is encoded by the encoding portion 402 into packetized data. Packetized data is transmitted to a base station 14a. A decoding portion 413 of a vocoder 411, converts the packetized data into a standard pulse code modulated signal (PCM) for transmission on the PSTN (not shown). The PCM signal is transmitted over the PSTN to a target base station 14b, which pages the target remote terminal 12b. The encoding portion 422 of a vocoder 421 at the target base station 14b encodes the PCM signal into packetized data, for transmission to a remote terminal 12b. The decoding portion 433 of a vocoder 431 at the remote terminal 12b decodes the packetized data and forms synthesized speech.

The process described above is also used to transmit signals from remote terminal 12b to remote terminal 12a. The use of multiple vocoders as illustrated by FIG. 4 is termed "tandem vocoding." A degradation of the speech signal occurs due to the multiplicity of encoding and decoding functions performed upon the speech signal. Tandem vocoding can be bypassed if the vocoder at the base station has the same configuration as the vocoder at the target destination. Implementation details of vocoder bypass are described in U.S. Pat. No. 5,956,673, entitled, "Detection and Bypass of Tandem Vocoding Using Detection Codes," assigned to the assignee of the present invention and incorporated by reference herein. In particular, a pseudorandom detection code can be embedded within the PCM output so that a receiving vocoder with the correct service option programming can detect the code and thereby conclude that the originating party utilized a similar vocoder. If the vocoders of the remote terminals are the same, then the decoder of the target remote terminal can decode the encoded speech generated by the originating remote terminal.

Acoustic speech is usually composed of low and high frequency components. However, due to the physical limitations of a conventional telephone system, input speech is band limited to a narrow range of 200 Hz to 3400 Hz. A filter is a device that modifies the frequency spectrum of an input waveform to produce an output waveform. Such modifications can be characterized by the transfer function $H(f)=Y(f)/X(f)$, which relates the modified output waveform $y(t)$ to the original input waveform $x(t)$ in the frequency domain.

Figure 2A:
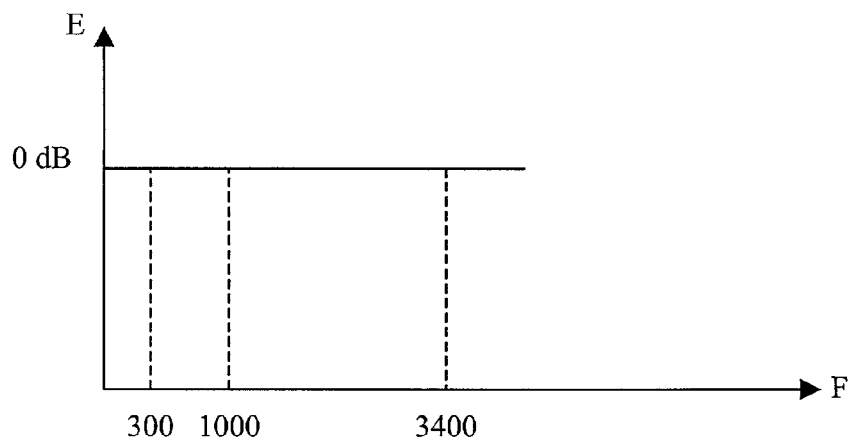
FIG. 2A is a graph of a flat narrowband frequency response.

FIG. 2A illustrates the spectrum of a narrowband filter with a flat frequency response. An example of a device with this characteristic is a microphone. As shown, the lower frequencies are overemphasized and the higher frequencies are cut off. An input signal that passes through this filter would result in an output waveform that is perceptually unpleasant to the human ear, i.e., the filtered speech is muffled.

Figure 2B:
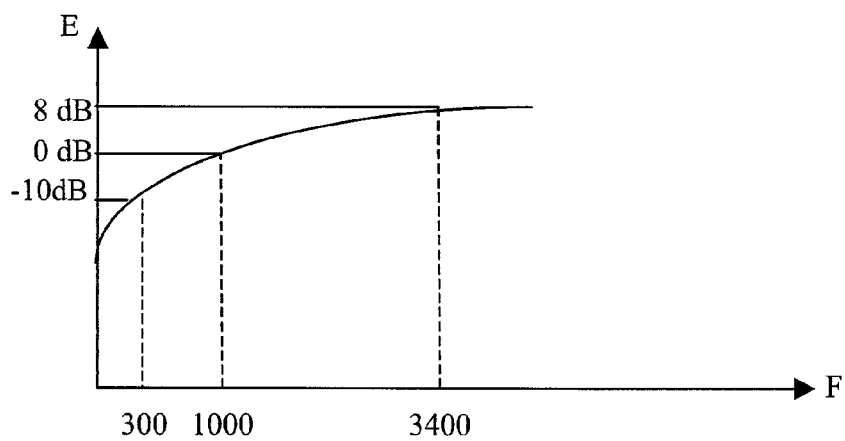
FIG. 2B is a graph of a spectrum of a narrowband filter that emphasizes the frequencies between 1000 Hz and 3400 Hz.

FIG. 2B illustrates the spectrum of a narrowband filter that emphasizes the frequencies between 1000 Hz and 3400 Hz. In this example, the lower frequencies are attenuated, but the frequency spectrum between 1000 Hz and 3400 Hz is emphasized. The emphasis in this frequency range perceptually compensates for the omission of frequency components above 3400 Hz. Hence, a more "natural" and intelligible sound is perceived by the end user when hearing the filtered signal.

Figure 3:
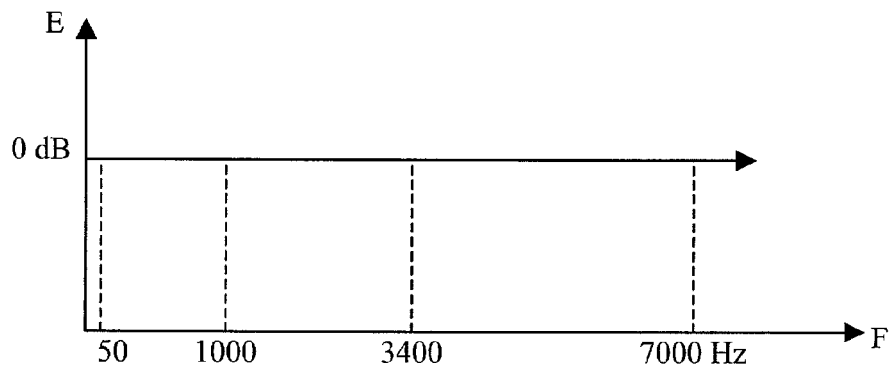
FIG. 3 is a graph of a flat wideband frequency response.

Due to improvements in wireless telephony, many wireless communication systems are capable of propagating acoustic signals in the wider range of 50 Hz to 7000 Hz. Such signals are referred to as wideband signals. Communications using this frequency range have been standardized in document G.722 ITU-T, entitled "7 kHz Audio-Coding within 64 kBits/s," published in 1989. Since frequency components up to 7000 Hz can be carried by a wideband system, a typical wideband decoder can be implemented with a flat frequency response. FIG. 3 is a graph of the flat frequency spectrum of a wideband signal. No emphasis is required since the frequency components between 3400 Hz and 7000 Hz are included. Inclusion of these higher frequency components produces a perceptually intelligible waveform without the need to emphasize the frequency range between 1000 Hz and 3400 Hz.

In the current state of the art, the wideband signal is band limited to the constraints of the narrowband terminal/system by a simple frequency cut off at 3400 Hz. This wideband-to-narrowband conversion can be accomplished by passing the wideband signal through a low pass filter and down-sampling the result. Hence, the spectrum of a converted wideband signal closely resembles the spectrum of FIG. 2A. As discussed above, this flat frequency response produces an unacceptable waveform for human perception. A bandwidth switching filter for solving this problem is presented in co-pending U.S. patent application Ser. No. 09/771,508, entitled, "Enhanced Conversion of Wideband Signals to Narrowband Signals," filed on Jan. 24, 2001, assigned to the assignee of the present invention and incorporated by reference herein. In the aforementioned U.S. Patent Application, a wideband signal can be transformed into a narrowband signal with pleasing acoustical properties.

However, a problem arises when a wideband terminal is used within wireless communication systems using multiple vocoders. Namely, a wideband signal cannot undergo tandem vocoding due to the current capacity limitations of the transmission medium. Currently, the maximum data capacity for a PSTN connection is 64 kbps. For a narrowband signal, 8000 samples/second must be obtained for accurate reconstruction of the original signal. Standard PCM sample data is represented using 8-bit symbols. By using 8-bit symbols, the maximum data capacity for the PSTN connection is reached (8000 samples/sec×8 bits/sample=64,000 bps) while minimizing quantization errors.

However, for a wideband signal, 16,000 samples/second must be obtained for accurate reconstruction of the original signal. Hence, in order to fit within the 64 kbps limitation, the PCM samples must be represented by 4-bit symbols (16,000×4=64,000). This shortening of the symbol length leads to an unacceptable amount of quantization error during the reconstruction of the signal.

In one embodiment, the problems arising from the physical constraints of the 64 kbps PSTN connection can be avoided by implementing a tandem free operation (TFO) mode, wherein a wideband signal can be conveyed over the PSTN to a wideband terminal through the use of 8-bit PCM symbols and packetized data punctured into the PCM symbols. In one aspect, packets containing the wideband speech signal are implanted in a pseudo-random manner into the least significant bits (LSB) of the mantissa value portion of the PCM data format. Upon receiving the punctured PCM symbols, the base station vocoder stops converting the received PCM symbols into packetized data and simply passes the already received packetized data to the target terminal. Hence, an encoding step is omitted from the communication session.

In another embodiment, a call set-up procedure is presented wherein negotiations for a wideband tandem free operation (TFO-WB) occur between various communication equipment within the communication system.

In another embodiment, a call set-up procedure is described wherein a conversion between a narrowband tandem free operation (TFO-NB) and a TFO-WB can occur without affecting the acoustic quality between users.

Figure 5:
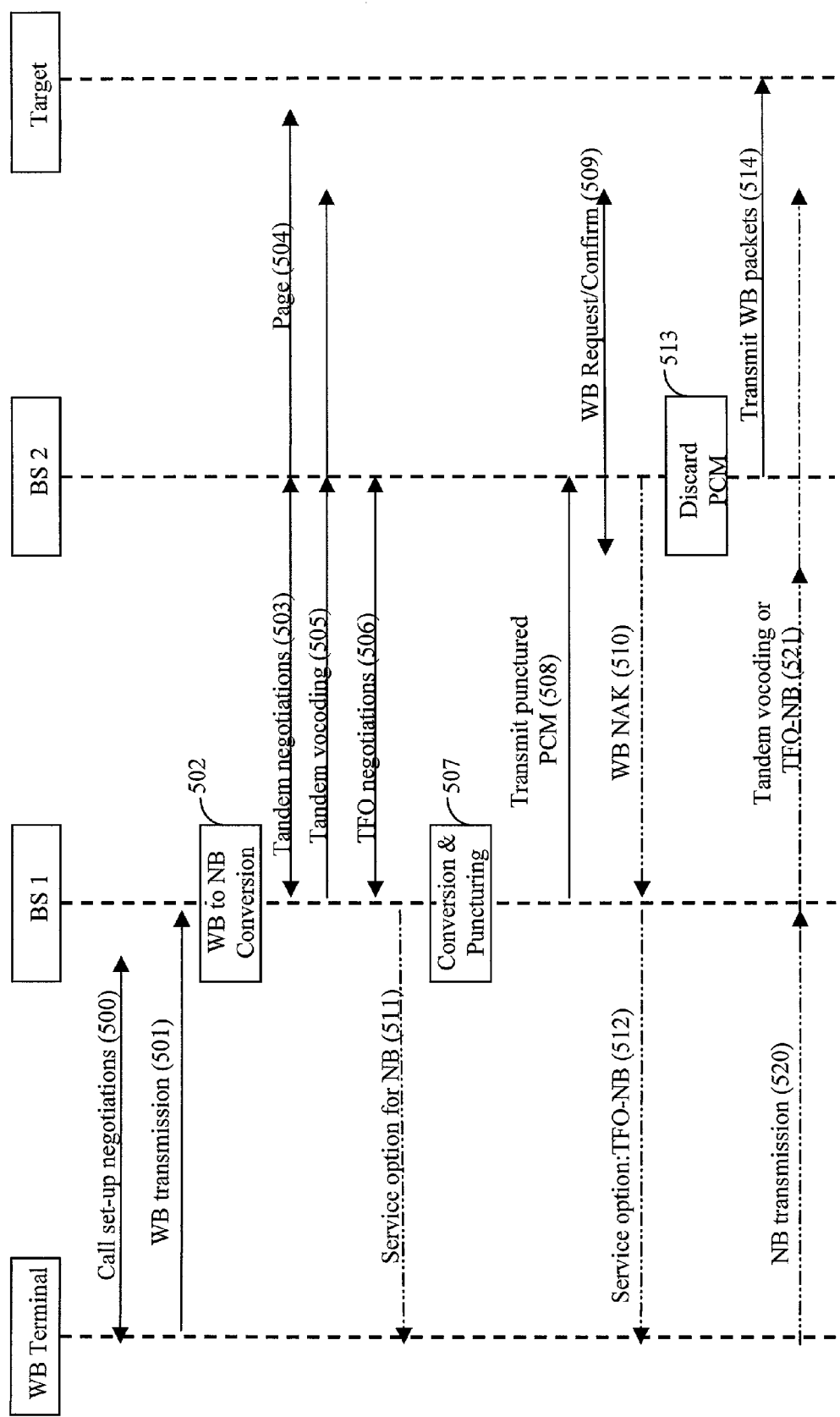
FIG. 5 is a timing diagram of a call set-up procedure for a terminal capable of wideband signal generation.

FIG. 5 is a flow chart of a call set-up procedure for a TFO-WB communication session. At step 500, call set-up negotiations between a terminal and a base station start. During the course of negotiations, the base station determines that the terminal is wideband capable. At step 501, the wideband terminal encodes a wideband signal and transmits the encoded (packetized) data to a first base station. At step 502, the first base station decodes the packetized wideband signal and converts the wideband signal into a narrowband signal, using apparatus and methods described in U.S. patent application Ser. No. 09/771,508. A register in the base station or mobile switching center stores information indicating that a second base station services the target terminal. For the sake of illustrative clarity, transmissions through a mobile switching center and the PSTN are omitted, but those with skill in the art understand that the intermediate points of the transmission relay need not be explained herein in order to understand the scope of the embodiments described herein.

At step 503, the first base station contacts a second base station to negotiate service. At step 504, the second base station pages the target terminal and sets up the call. Configuration messages are transmitted on the paging channel, in accordance with IS-95, cdma2000, WCDMA, TDMA or FDMA standards. At step 505, a tandem vocoding session begins between the wideband terminal and the target terminal.

At step 506, a control element in the first base station and a control element in the second base station negotiate for tandem-free operations, wherein a successful negotiation includes the disablement of "in path" equipment, such as echo cancellers, for reasons described below. Alternatively, if the target terminal does not share the same vocoder configuration as the originating terminal, then at step 511, a control element determines that a service option signal is to be transmitted from the first base station to the originating terminal and the communication session is to continue using narrowband signals.

At step 507, after the negotiations of step 506 indicate that tandem-free operation is permissible, an encoder in the first base station converts the narrowband signal into a PCM digital signal. The packetized wideband signal from the originating terminal is punctured into the bit stream of the PCM digital signal after negotiations between the base stations are complete. At step 508, the first base station transmits the punctured narrowband PCM digital signal to the second base station.

At step 509, the second base station transmits a request message as to the frequency capacity of the target terminal. If the second base station receives a confirmation message, indicating that the target terminal is capable of processing and generating wideband speech signals, then at step 513, the encoder of the second base station discards the bits comprising the narrowband PCM signal and forwards the bits of packetized data representing the wideband speech signal at step 514. Since the PCM data bits are discarded and only packet data bits are forwarded, the in-path equipment that would normally enhance acoustic signals, which are regenerated from the PCM data bits, should be disabled.

In order for the target terminal to process the packetized wideband speech signal, the vocoder located at the target terminal must have the same or similar configuration as the vocoder at the originating terminal. The target terminal must be able to decode the encoding scheme used by the originating terminal in order to implement this embodiment. Hence, once a positive determination is made as to the similarity of the remote station vocoders, transmissions may continue without the operation of the decoding portion of the target base station vocoder. As with the other in-path equipment, the decoding portion of the target base station vocoder may be disabled.

If the target terminal is not wideband capable, but shares vocoder configurations with the originating terminal, then at step 510, a message indicating such limitation is transmitted from the target base station to the originating base station. At step 512, a service option signal can be transmitted from the control element in the first base station to the originating terminal, wherein the service option signal commands the wideband terminal to transmit narrowband signals to the first base station at step 520.

Since the target terminal cannot process wideband signals without the loss of acoustic quality, it is a waste of system resources (i.e., the link capacity between the originating terminal and the base station) to allow the wideband terminal to continue transmitting a signal with a wide spectrum frequency response. However, the similarity between vocoders allows the system to perform tandem-free operations, as detailed in aforementioned U.S. Pat. No. 5,956,673. Hence, the system can be configured to transmit signals by using narrowband tandem-free vocoding at step 521, or if the vocoders are not similar, then by using standard tandem vocoding.

In summary, if the vocoder at the originating terminal has the same configuration as the vocoder at the target terminal, then the resulting communications session from the above set-up procedure is structured so that the originating terminal can transmit a plurality of packets carrying a wideband signal to the first base station, whereupon the first base station decodes the packetized wideband signal, converts the wideband signal into a narrowband signal, digitizes the narrowband signal into a PCM signal that fits the constraints of a standard 64 kHz PSTN transmission line, and punctures the PCM signal with bits from the plurality of packets carrying the wideband signal. At the second base station, the received PCM signal bits are discarded, and the packetized wideband signal is forwarded to the target terminal. At the target terminal, the vocoder decodes the packetized wideband signal and synthesizes an acoustic speech signal for the user.

It should be understood that this signal transportation scheme is also performed for speech originating at the target terminal and ending at the originating terminal. It should also be understood that in this embodiment, the transmission of the narrowband PCM signal is necessary only for compliance with a federal mandate requiring the accessibility of inter-party communications by appropriate law enforcement authorities. However, in the following embodiment, the narrowband PCM signal may be used to allow the transparent switch between narrowband and wideband service options after a wideband communication session has already been set up.

Figure 6:
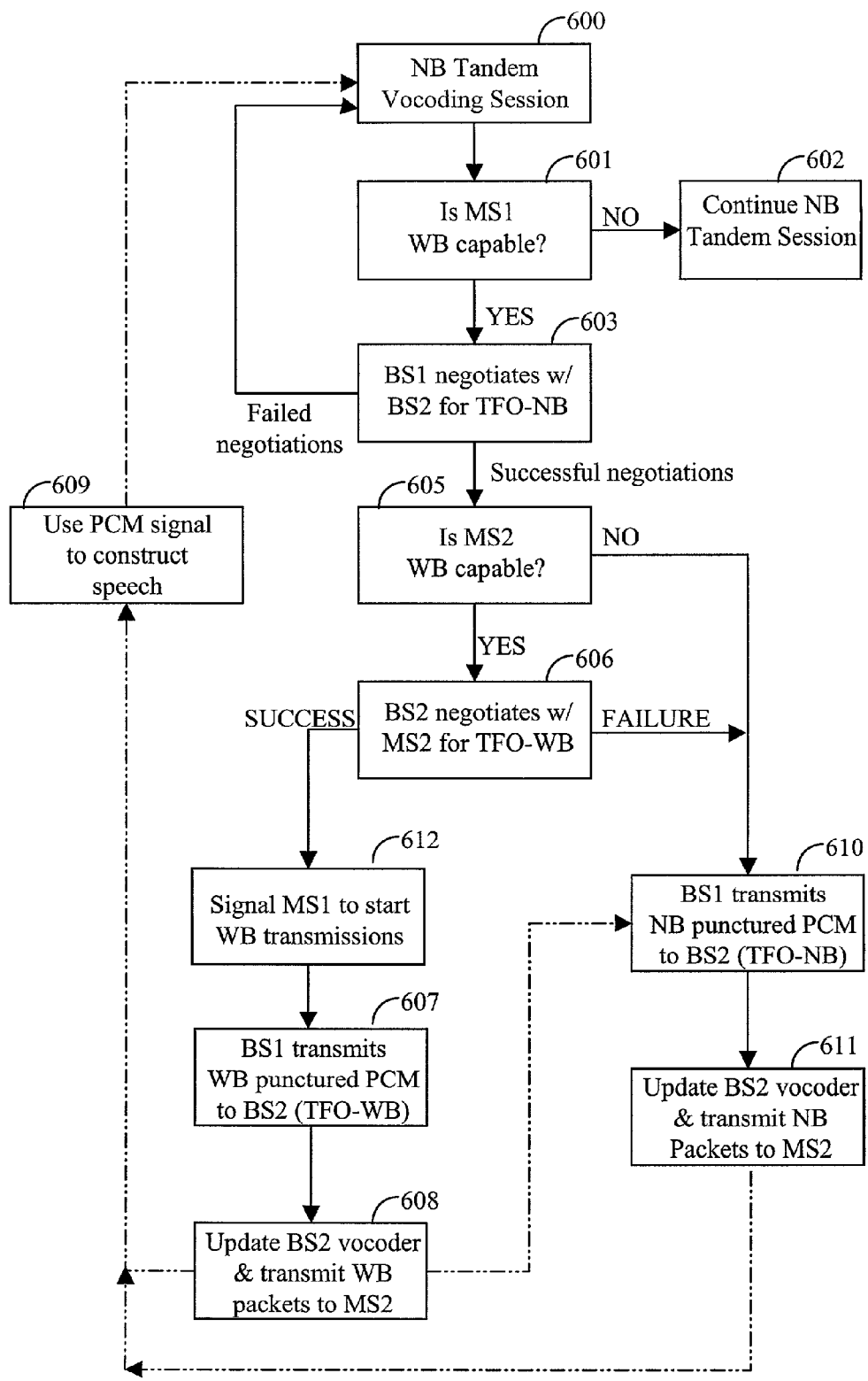
FIG. 6 is a flow chart of a conversion between wideband and narrowband communication sessions.

FIG. 6 is a flow chart of a procedure that permits the communication system to switch between narrowband tandem-free operations (TFO-NB) and wideband tandem-free operations (TFO-WB) and standard narrowband tandem vocoding. At step 600, an originating terminal is communicating with a target terminal using normal, narrowband tandem vocoding. At step 601, a control element in the originating base station determines that the originating terminal is capable of generating wideband speech signals and that the link between the originating terminal and the base station can support transmission of packetized wideband signals. If the originating terminal is not wideband capable, then the tandem vocoding continues at step 602.

If the originating terminal is wideband capable, then at step 603, the originating base station negotiates with the target base station to perform tandem-free vocoding. If the negotiations fail, then standard narrowband tandem operations continue at step 600. If the negotiations are successful, then at step 605, the target base station transmits a request message to the target terminal as to whether the target terminal is capable of processing and generating wideband speech signals. If the target terminal is not wideband capable, then the program flow continues to step 610, wherein narrowband tandem-free vocoding commences.

If the target base station receives a confirmation message from the target terminal, then at step 606, the target terminal and the target base station negotiate for wideband tandem-free operations. Implementation of TFO-WB follows upon the successful negotiation of step 606. At step 612, an indicator signal is transmitted from the target base station to the originating base station, which notifies the originating terminal to start the transmission of wideband signals. It should be noted that up to this point in the program flow, the originating terminal is transmitting in a narrowband tandem vocoding mode.

At step 607, the originating base station transmits a narrowband pulse code modulation (PCM) digital signal punctured with wideband packets. As discussed above in a previous embodiment, this punctured narrowband PCM signal is produced by the steps of generating a wideband signal at the originating terminal, transmitting the wideband signal in data packets, extracting the wideband signal from the packets, converting the wideband signal into a narrowband signal, encoding the narrowband signal into a narrowband PCM digital signal, and then puncturing the narrowband PCM digital signal with bits from the packetized wideband signal, which had been transmitted from the originating terminal to the originating base station. Methods and apparatus for transforming wideband speech signals into narrowband signals are presented in U.S. patent application Ser. No. 09/771,508.

However, unlike the embodiment described in FIG. 5, the target base station does not discard the narrowband PCM digital signal. At step 608, the target base station receives the punctured narrowband PCM signal, extracts the narrowband PCM signal portion from the punctured signal, and uses the extracted, narrowband PCM signal portion to update the state metrics of the local vocoders.

If a control element in the target base station detects an interruption of the TFO-WB session at step 609, then the target base station stops discarding the narrowband PCM digital signals, and starts converting the digital signals into acoustic speech. Hence, the system continues the communication session using narrowband tandem vocoding, as in step 600. Since the vocoder state metrics have been updated by the received digital signals, the switch from packetized wideband signals to narrowband PCM signals is transparent to the user, i.e., no loss of acoustic quality is perceived. One reason for an interruption may be the failure to disable the in-path equipment during the entire TFO-WB session.

Alternatively, if the wideband service option is not successfully negotiated between any portions of the communication relay or if the service is interrupted, then narrowband speech packets can be generated and exchanged by each terminal so that TFO-NB is implemented. TFO-NB is superior over tandem vocoding due to the reduction of encoding and decoding steps upon the original acoustic speech. At step 610, the originating base station transmits a narrowband PCM digital signal punctured with narrowband packets. The narrowband packets can originate directly from the originating terminal, upon receipt of notification from the originating base station, or the narrowband packets can be generated by the originating base station from received wideband packets. At step 611, the state metrics of the target base station vocoder are updated. If the TFO-NB session is interrupted, then the target base station stops discarding the PCM signal and starts converting the PCM signals into acoustic speech at step 609. The program flow then proceeds to a standard tandem vocoding communication session between the originating terminal and the target terminal.

Thus, novel and improved methods and apparatus for facilitating the use of wideband terminals in either wideband or narrowband environments have been described. Those of skill in the art would understand that the various illustrative logical blocks, modules, circuits, and algorithm steps described in connection with the embodiments disclosed herein may be implemented as electronic hardware, software, firmware, or combinations thereof. The various illustrative components, blocks, modules, circuits, and steps have been described generally in terms of their functionality. Whether the functionality is implemented as hardware, software, or firmware depends upon the particular application and design constraints imposed on the overall system. Skilled artisans recognize the interchangeability of hardware, software, and firmware under these circumstances, and how best to implement the described functionality for each particular application.

Implementation of various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components. A processor executing a set of firmware instructions, any conventional programmable software module and a processor, or any combination thereof can be designed to perform the functions of the control element described herein. The processor may be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. An exemplary processor is coupled to the storage medium so as to read information from, and write information to, the storage medium. In the alternative, the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc. Those of skill would further appreciate that the data, instructions, commands, information, signals, bits, symbols, and chips that may be referenced throughout the above description are represented by voltages, currents, electromagnetic waves, magnetic fields or particles, optical fields or particles, or any combination thereof.

Various embodiments of the present invention have thus been shown and described. It would be apparent to one of ordinary skill in the art, however, that numerous alterations may be made to the embodiments herein disclosed without departing from the spirit or scope of the invention.

What is claimed is:

1. A method for transmitting wideband speech signals over a narrowband communication system, comprising:
    generating a narrowband digital signal at a base station from a plurality of data packets received from a remote station, wherein the plurality of data packets carry a wideband speech signal;
    puncturing the narrowband digital signal by inserting the plurality of data packets carrying the wideband speech signal into the narrowband digital signal;
    transmitting the punctured narrowband digital signal over the narrowband communication system to a second base station;
    separating the narrowband digital signal from the plurality of data packets at the second base station; and
    forwarding only the plurality of data packets to a second remote station.

2. The method of claim 1, wherein the puncturing of the narrowband digital signal occurs in the least significant bits of the narrowband digital signal.

3. The method of claim 1, further comprising disabling a plurality of in-path equipment at the first base station and the second base station.

4. The method of claim 3, wherein the plurality of in-path equipment comprise echo cancellers.

5. The method of claim 3, wherein the plurality of in-path equipment comprise a decoding portion of a vocoder.

6. The method of claim 1, farther comprising the step of negotiating for tandem-free operations between the first base station and the second base station before the step of puncturing.

7. The method of claim 1, wherein the narrowband digital signal is a pulse code modulated (PCM) signal.

8. The method of claim 1, wherein the wideband speech signal includes frequency components between 3400 Hz and 7000 Hz.

9. The method of claim 1, wherein the wideband speech signal comprises an acoustic signal in the range of 50 Hz to 7000 Hz.

10. The method of claim 1, further comprising discarding bits comprising the narrowband digital signal.

11. A system for transmitting wideband speech signals over a narrowband communication network, comprising:
    means for generating a narrowband digital signal at a base station from a plurality of data packets received from a remote station, wherein the plurality of data packets carry a wideband speech signal;
    means for puncturing the narrowband digital signal by inserting the plurality of data packets carrying the wideband speech signal into the narrowband digital signal;
    means for transmitting the punctured narrowband digital signal over the narrowband communication network to a second base station;
    means for separating the narrowband digital signal from the plurality of data packets at the second base station; and
    means for forwarding the plurality of data packets to a second remote station.

12. The system of claim 11, wherein the means for puncturing the narrowband digital signal uses the least significant bits of the narrowband digital signal.

13. The system of claim 11, further comprising means for disabling a plurality of in-path equipment at the first base station and the second base station.

14. The system of claim 13, wherein the plurality of in-path equipment comprise echo cancellers.

15. The system of claim 13, wherein the plurality of in-path equipment comprise a decoding portion of a vocoder.

16. The system of claim 11, further comprising means for negotiating for tandem-free operations between the first base station and the second base station before the means for puncturing punctures the narrowband digital signal.

17. The system of claim 11, wherein the narrowband digital signal is a pulse code modulated (PCM) signal.

18. The system of claim 11, wherein the wideband speech signal includes frequency components between 3400 Hz and 7000 Hz.

19. The system of claim 11, wherein the wideband speech signal comprises an acoustic signal in the range of 50 Hz to 7000 Hz.

20. The system of claim 11, further comprising means for discarding bits comprising the narrowband digital signal.

21. The method recited in claim 20, further comprising:
    receiving the punctured narrowband digital signal at a base station.

22. The method recited in claim 21, wherein upon receiving the punctured narrowband signal, the base station stops any conversion of PCM symbols into data packets and passes the punctured narrowband signal to a target terminal.

23. The method recited in claim 20, wherein the wideband speech signal includes frequency components between 3400 Hz and 7000 Hz.

24. The method recited in claim 20, wherein the wideband speech signal comprises an acoustic signal in the range of 50 Hz to 7000 Hz.

25. The method recited in claim 20, wherein the puncturing of the narrowband signal comprises discarding bits contained in the narrowband digital signal.

26. A method for transmitting wideband speech signals over a narrowband communication system, comprising:
    generating a narrowband digital signal at a base station from a plurality of data packets received from a remote station, wherein the plurality of data packets carry a wideband speech signal;
    puncturing the narrowband digital signal with the plurality of data packets carrying the wideband speech signal;
    transmitting the punctured narrowband digital signal over the narrowband communication system to a second base station;
    separating the narrowband digital signal from the plurality of data packets at the second base station; and
    forwarding only the plurality of data packets to a second remote station,
    wherein generating the narrowband digital signal comprises:
        decoding the plurality of data packets to recover the wideband speech signal;
        generating a narrowband speech signal from the wideband speech signal; and
        digitizing the narrowband speech signal.

27. A system for transmitting wideband speech signals over a narrowband communication network, comprising:

means for generating a narrowband digital signal at a base station from a plurality of data packets received from a remote station, wherein the plurality of data packets carry a wideband speech signal;

means for puncturing the narrowband digital signal with the plurality of data packets carrying the wideband speech signal;

means for transmitting the punctured narrowband digital signal over the narrowband communication network to a second base station;

means for separating the narrowband digital signal from the plurality of data packets at the second base station; and means for forwarding the plurality of data packets to a second remote station, wherein means for generating the narrowband digital signal comprises:

means for decoding the plurality of data packets to recover the wideband speech signal;

means for generating a narrowband speech signal from the wideband speech signal; and means for digitizing the narrowband speech signal.

28. A method of creating a narrowband digital signal containing data packets carrying a wideband speech signal in a communications system, comprising:

generating said narrowband digital signal having 8-bit pulse code modulated (PCM) symbols; and puncturing the narrowband digital signal by inserting, in a psuedo-random basis, a plurality of data packets containing said wideband speech signal into the least significant bits (LSB) of a mantissa value portion of the PCM symbols.

29. A method of encoding wideband speech signal information for compatibility with a narrowband communication system, comprising:

generating a narrowband digital signal at a base station from a plurality of data packets received from a remote station, wherein the plurality of data packets carry a wideband speech signal; and puncturing the narrowband digital signal by inserting the plurality of data packets carrying the wideband speech signal into the narrowband digital signal.

30. The method of claim 29, wherein the puncturing of the narrowband digital signal occurs in the least significant bits of the narrowband digital signal.

31. The method of claim 29, further comprising disabling a plurality of in path equipment at the base station.

32. The method of claim 31, wherein the plurality of in-path equipment comprises echo cancellers.

33. The method of claim 31 wherein the plurality of in-path equipment comprises a decoding portion of a vocoder.

34. The method of claim 29, further comprising: negotiating for tandem-free operations between the first base station and the second base station before the operation of puncturing.

35. The method of claim 29, wherein the narrowband digital signal is a pulse code modulated (PCM) signal.

* * * * *